Figure 1:
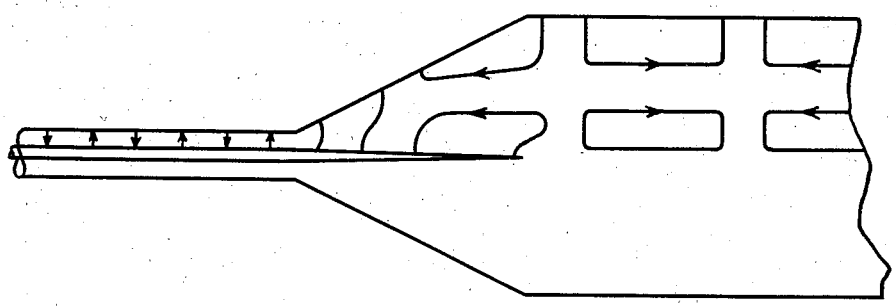

Aug. 11, 1942.    H. J. R. VON BAEYER    2,292,496
TRANSMISSION LINE CIRCUIT
Filed July 3, 1940    2 Sheets-Sheet 1

Inventor
Hans Jacob Ritter von Baeyer,
By H. S. Grover
Attorney

Aug. 11, 1942.   H. J. R. VON BAEYER   2,292,496
TRANSMISSION LINE CIRCUIT
Filed July 3, 1940   2 Sheets-Sheet 2
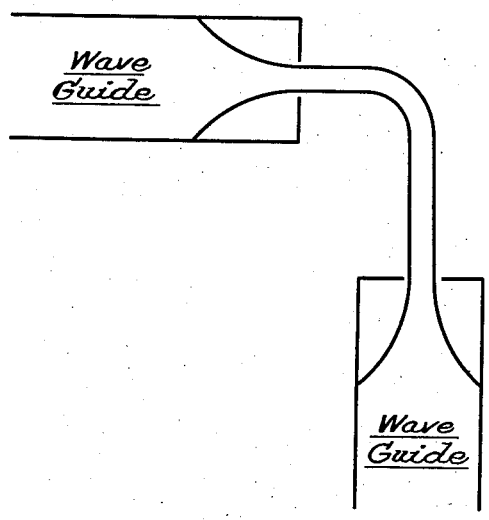
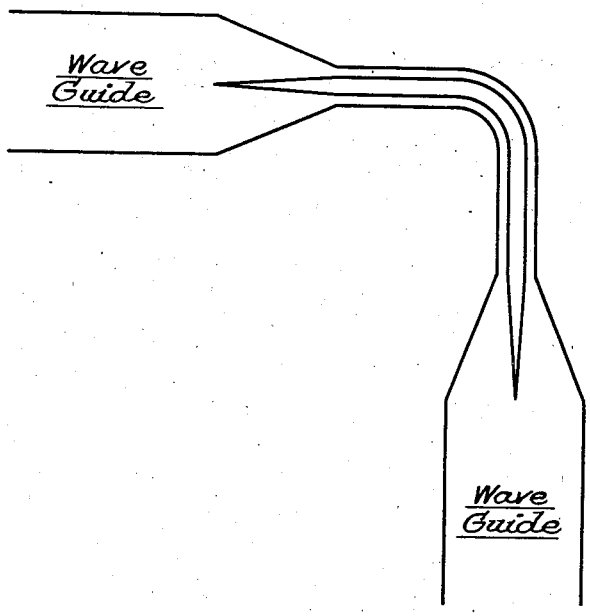
INVENTOR
Hans Jacob Ritter von Baeyer
BY
ATTORNEY Patented Aug. 11, 1942

2,292,496

UNITED STATES PATENT OFFICE 2,292,496

TRANSMISSION LINE CIRCUIT

Hans Jacob Ritter von Baeyer, Berlin, Germany, assignor to Telefunken Gesellschaft für Drahtlose Telegraphie m. b. H., Berlin, Germany, a corporation of Germany Application July 3, 1940, Serial No. 343,758
In Germany May 19, 1939

10 Claims. (Cl. 178—44)

Electromagnetic waves along lines are propagated either by the use of double wire lines or of coaxial or concentric lines, as well known in the art. In these lines the electrical field between the conductors is positioned exactly at right angles to the direction of propagation so that in longitudinal direction of the line there are only conduction currents, but no displacement currents. However, these properties which govern the speed of propagation and damping or attenuation of waves, will exist only as long as the intervening space of the conductors is small in contrast to the wavelength. But, if the line dimensions are so large, or the wavelength of the oscillations to be conducted so low, that the conductor spacing comes to be in the neighborhood of a half wavelength, the field lines detach from the conductors and the field distribution and pattern becomes of a nature resulting in not only a transverse or cross component, but also a longitudinal or series component of the electrical or magnetic field, and this results in displacement currents in longitudinal direction of the line. This form of wave propagation has come to be called a hollow tube oscillation or a dielectric wave, and the same may be likened to a free electromagnetic radiation which propagates in space between the conductors.

Dielectric or hollow tube lines have of late extensively been used for the conduction or propagation of ultra short waves. One serious difficulty which arises in their use resides in the task of establishing coupling relations between these lines and conventional oscillation receivers or generators. What has been used for this purpose in the past are small dipole or frame antennae which are fed from a conventional radio frequency line and which are placed inside the hollow tube line. However, such arrangement not only means a disturbance of the latter by portions of conductor protruding therein, but also also more elaborate construction and circuit means especially in connection with adjustment, etc.

The invention discloses simpler and more satisfactory and efficient coupling means for hollow-tube lines or dielectric lines. The invention is predicated upon the consideration set forth above, in that the initially normal or standard radio frequency line is continuously and steadily changed into a hollow-tube or dielectric line. This is accomplished by expanding the spacing of the conductors of the double-wire or coaxial line inside a portion equal to several wavelengths to an extent so that the wire waves will become detached inside this length of line and are altered into the dielectric wave form, and that the widened double wire line or coaxial line changes directly into the dielectric or hollow-tube line. In this scheme the circumstance that the dimensions of the normal radio frequency line are invariably very small in contrast to the diameter of the dielectric line (and this at the outest is a troublesome factor) is profitably utilized so that there is no need to decrease the dimensions of the dielectric lines artificially by the use of a dielectric having a high dielectric constant which is always attended with high damping.

Figure 2:
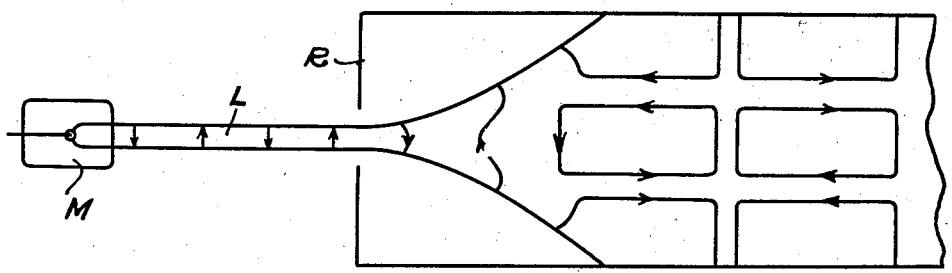

A better understanding of the invention may be had by referring to the following detailed description, which is accompanied by drawings wherein:

Figs. 1 and 2 illustrate two different embodiments of the present invention, showing transmission lines in energy coupling relation to wave guides; and Figs. 3 and 4 illustrate other embodiments of the invention in which the features of Figs. 1 and 2 are employed in connection with a pair of wave guides.

Fig. 1 illustrates an application of the basic idea of the inveniton to a coaxial line, the latter having its beginning on the left-hand side and changes gradually into a dieletric line. In this scheme the inner conductor of the coaxial line, inside the dielectric line, may either terminate suddenly or else be tapered in a way as shown. The illustration also shows the field distribution in the upper half of the line. There is no need to explain it.

Fig. 2 illustrates the transition from a preferably band-shaped (ribbon) double line L into a dielectric line H. Line L which is brought directly from a magnetron generator M and which may be tuned by the aid of a short circuiting bridge or slide piece is brought through an opening in the closure disc R of the dielectric line H and is thereupon slowly expanded so as to match the diameter of the dielectric line, this resulting in the detaching of the field lines in a way as indicated. The breadth of the bands preferably grows with growing distance in order to stabilize the characteristic impedance.

The invention may serve as a coupling means not only at the beginning and the end of a dielectric line, but may also be employed in curvatures of the dielectric line. Inasmuch as not all types of dielectric waves are suited to travel around curvatures, it may be preferable to pass the waves, at a point ahead of the curvature, into a coaxial or double wire line, while beyond the curvature they are conducted again into the dielectric or tubular line. Also, in this case the continuous and gradual transitions hereinbefore disclosed may be employed. Figs. 3 and 4 show such an arrangement.

What is claimed is:

1. In combination, a two-conductor feeder and a hollow tubular chamber, said feeder entering said chamber through an aperture therein and being in energy coupling relation thereto, the conductors of said feeder in said chamber gradually diverging from the axis of said chamber and curving away from a straight line continuation over a distance at least equal to a plurality of lengths of the communication wave passing over said feeder.

2. In combination, a two-conductor feeder, and a tubular wave guide, the diameter of said guide being appreciably larger than the normal distance between the conductors of said feeder, an end plate for said guide and having an aperture therein, the conductors of said feeder entering said wave guide through said aperture and gradually diverging to meet opposite walls of said wave guide.

3. In combination, a coaxial line, a hollow tubular wave guide having a diameter at least equal to several lengths of the communication wave, the outer conductor of said coaxial line gradually expanding to meet and join one end of said guide, the inner conductor of said line entering said guide and tapering down to a point.

4. An energy transfer circuit comprising a two-conductor transmission line having a pair of band-shaped parallel conductors, a wave guide having a diameter which is large compared to the distance between the parallel conductors of said line, a terminal structure connecting said line and guide in energy transfer relation, said terminal structure comprising a pair of conductors at least several wavelengths long at the operating frequency in the interior of said guide, said last conductors being continuations of the two conductors of said transmission line and gradually diverging over substantially the entire length of said terminal structure, the width of these last conductors of said terminal structure increasing with increasing distance between them.

5. An energy transfer circuit comprising a two-conductor transmission line having a pair of parallel conductors, a hollow wave guide having a diameter which is large compared to the distance between the parallel conductors of said line, a terminal structure connecting said line and guide in energy transfer relation, said terminal structure comprising a pair of conductors at least several wavelengths long at the operating frequency, said last conductors being continuations of the two conductors of said transmission line and so constructed and arranged that the distance between them gradually increases over the entire length of said structure until the distance therebetween conforms to the diameter of said wave guide.

6. In combination, a pair of wave guides, an intermediate energy coupling line comprising a pair of parallel conductors whose ends terminate in the interiors of said wave guides, the terminating portions of said parallel conductors at at least one end gradually diverging in opposite directions over a length at least several wavelengths long at the operating frequency.

7. In combination, a pair of wave guide sections angularly disposed relative to each other, energy transfer means for transferring the energy from one of said sections to the other comprising a pair of curved parallel band-shaped conductors whose ends enter into the interiors of said sections, said ends gradually diverging in each of said sections.

8. In combination, a pair of wave guide sections angularly disposed relative to each other, energy transfer means for transferring the energy from one of said sections to the other comprising a pair of curved parallel band-shaped conductors whose ends enter into the interior of said sections, said ends gradually diverging in each of said sections to meet the walls of said sections.

9. In combination, a pair of wave guide sections angularly disposed relative to each other, energy transfer means for transferring energy from one of said sections to the other comprising a curved coaxial line whose ends enter into the interiors of said sections for a plurality of lengths of the communication wave, each of the conductors of said line in the interior of at least one of said sections gradually changing in transverse dimensions over a plurality of wavelengths.

10. In combination, a pair of wave guide sections angularly disposed relative to each other, energy transfer means for transferring energy from one of said sections to the other comprising a curved transmission line whose ends enter into the interiors of said sections for a plurality of lengths of the communication wave, the conductors of said line in the interior of each of said sections gradually diverging in opposite directions over a plurality of wavelengths to obtain a gradual increase in spacing therebetween over said distance.

HANS JACOB RITTER VON BAEYER.